United States Patent
Williams

[15] 3,662,569
[45] May 16, 1972

[54] UNIVERSAL JOINTS

[72] Inventor: Ralph Williams, Coventry, England
[73] Assignee: The Torrington Company Limited, Coventry, England
[22] Filed: June 30, 1970
[21] Appl. No.: 51,102

[30] Foreign Application Priority Data

July 4, 1969 Great Britain .................... 33,807/69

[52] U.S. Cl. .................................................... 64/17 A
[51] Int. Cl. .......................................................F16d 3/32
[58] Field of Search ......................................................64/17

[56] References Cited

UNITED STATES PATENTS 2,844,949  7/1958  Stillwagon ..................... 64/17

FOREIGN PATENTS OR APPLICATIONS 550,332  10/1956  Belgium ......................... 64/17
963,249  7/1964  Great Britain .................. 64/17
1,152,958  2/1958  France ........................... 64/17

Primary Examiner—Edward G. Favors
Attorney—Carl R. Horten, David W. Tibbott and Frank S. Troidl

[57] ABSTRACT

A universal joint is disclosed which is made primarily of plastic. A center cube of the joint has two pairs of opposed rod ends. The arms of bifurcate members may be molded directly about the rod ends, or on a bearing mounted about the rod ends. The bifurcate members may be all plastic or plastic-covered steel. The center cube and rod ends may be molded as one integral plastic unit or, if desired, the rods may be made of steel with the center cube made of plastic and molded about the rods.

5 Claims, 6 Drawing Figures

PATENTED MAY 16 1972　　　　　　　　　　　　3,662,569

INVENTOR
RALPH H. WILLIAMS
BY
Frank S. Troidl
ATTORNEY

UNIVERSAL JOINTS

This invention relates universal joints.

A common form of universal joint comprises a pair of mutually perpendicular rods or pins extending from a central carrier member, often in the form of a cube and a fork or the like bifurcated member attached to the ends of each rod, the forks permitting a pair of shafts through which power is to be transmitted to be flexibly connected to one another even though there may be some degree of misalignment between the shafts. Usually a roller bearing is interposed between each arm of the fork and the region of the rod to which it is connected.

It will be appreciated that the assembly of a universal joint comprising a plurality of components as described above is quite complex and time consuming and the invention accordingly seeks to provide a universal joint which overcomes or at least reduces this disadvantage.

According to its broadest aspect, the present invention provides a universal joint in which a center piece is molded, in a plastics material, integrally with rod portions extending mutually perpendicularly from said center piece and in which forks also formed from a plastics material are subsequently molded around the integral center piece and rod component.

By virtue of the invention, therefore, the assembly of separate rods into a center piece and the provision of individual bearings between the rods and the co-operating fork arms are eliminated and a universal joint of simplified construction and economic manufacture results. The plastics materials used in the molding process may, for example, be nylon or polytetrafluoroethylene and may be reinforced if desired with glass fibers or carbon fibers. It will be appreciated that the forks need not be molded from the same material as the integral center piece and rod assembly.

According to another feature of the invention, instead of molding the rod portions integrally with a center piece, a center piece may be molded around a previously assembled perpendicular rod arrangement and in such a case the rods may, of course, be of a metal such as steel rather than of a plastics material. Conveniently, rod components for assembling together to constitute the perpendicular rod arrangement may each be centrally recessed or rebated with the recesses or rebates dimensioned so that two such rod components may be clipped together and if desired may thereafter be secured together by passing a suitable pin through them.

Where bearings are interposed between the rods and the fork arms connected to them, the method of assembly may be such that the forks are directly molded on to the bearings which themselves have been previously assembled on to the rod ends.

The invention will be further understood by reference to the following detailed description and drawings, in which.

Figure 1:
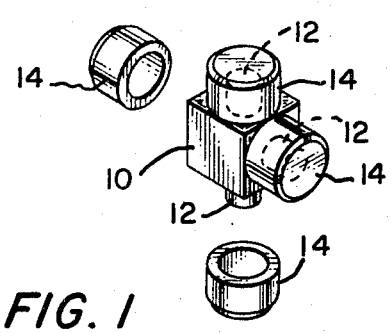
FIG. 1 is an elevation, partly in exploded perspective of a center piece for use in a universal joint.

Referring firstly to FIG. 1, a center piece for a universal joint will be seen to comprise a cube 10 having two pairs of opposed rod ends 12 extending from opposed faces of the cube. The center piece is illustrated as carrying a needle bearing 14 on each rod end 12.

Figure 2:
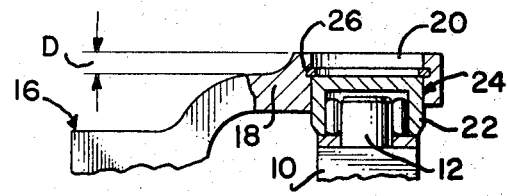
FIG. 2 is a median section through part of a conventional universal joint.

In a conventional universal joint, the cube 10 is often manufactured from steel, bored to receive either four rod ends or alternatively one integral rod situated in a through bore in the cube, with a pair of opposed rod ends located in perpendicular faces of the cube. When such an assembly is complete, it is then necessary in a conventional universal joint to fit the needle bearings on to the projecting rod ends. Thereafter, as shown in FIG. 2, it is necessary to connect the thrust transmitting forks to their respectively co-operating rod ends. A part of one such fork 16 is shown in FIG. 2 and will be seen to terminate in an arm 18 having its end region apertured at 20 to receive the outer race 22 of a needle bearing generally designated 24. It is customary to retain the bearing 24 against outward displacement in the aperture by means of a clip 26. Due to this arrangement, however, there is a depth D of the aperture 20, lying substantially between the clip 22 and the free outer face of the arm 18, which cannot usefully contribute to the supporting of the outer race 22 of the bearing.

Figure 3:
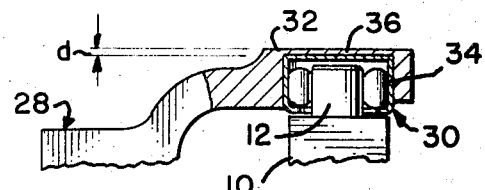
FIG. 3 is a similar section through part of a universal joint embodying the invention.

In accordance with one feature of the present invention, as shown in FIG. 3, a fork 28 is molded around a center piece 10, the rod ends 12 of which have previously been fitted with bearings 30. In the conventional bearing illustrated in FIG. 2, the space D remains because it is needed for manipulation during assembly, when the bearing 24 is pushed through the aperture 20 which has previously been positioned in a jig over the rod end 12. In the bearing proposed by the invention and shown in FIG. 3, because the forks 28 are molded over the previously assembled center piece and bearing arrangement, the arms 32 of the fork 28 are shaped in a mold around the bearing outer race 34, there is no requirement for any manipulative space to be left to accommodate the bearing assembly, the bearing is retained in the fork arm 32 by an integrally molded blind end 36 of that arm and therefore the bearing 30 is supported over a much greater depth, only the thickness $d$ of the end 36 being lost for this purpose.

Figure 5:
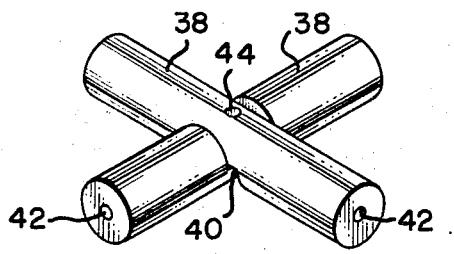
FIG. 5 illustrates the rod component of FIG. 4 assembled with a complementary component.
Figure 4:
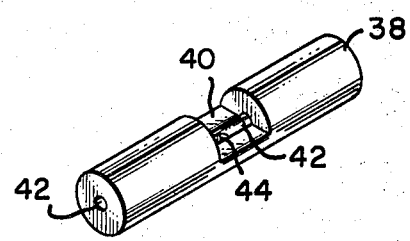
FIG. 4 is a perspective view of a rod component for use in a universal joint according to the invention.

As will be appreciated, the assembly comprising the center cube 10 and rod end 12 of FIG. 1 may be molded in a plastics material as an integral assembly. In that case, where both the rod ends 12 and, for example, the fork arms 32 of FIG. 3 are made of suitable thermoplastics materials, it is unnecessary for some applications to employ roller bearings at all and the forks 28 may then be themselves molded directly over the previously molded center piece and rod end components.

Where it is desired to employ center pieces using separate rods, a preferred rod configuration is illustrated in FIG. 4 which shows a rod 38 as having a central recess 40, the depth of which is approximately equal to the radius of the rod 38. The width of the recess 40 is commensurate with the diameter of the rod 38. FIG. 5 illustrates how two such rods 38 may then complement each other and may be clipped together in mutually perpendicular arrangement in which, if desired, they may be secured by passing a securing pin centrally through them. The perpendicular rod arrangement of FIG. 5 may thereafter be placed in a mold to have a center cube 10 molded around it and may subsequently be used in any of the embodiments of the invention herein described. In order to permit the relief of pressure build-up inside the bearings when the material is being molded around them, each rod 38 is shown as having an axial hole 42 running throughout its full length and the holes 42 communicate with cross drillings 44. The same axial holes and cross drillings serve to permit lubrication or re-lubrication of the bearings after the complete unit has been manufactured.

Figure 6:
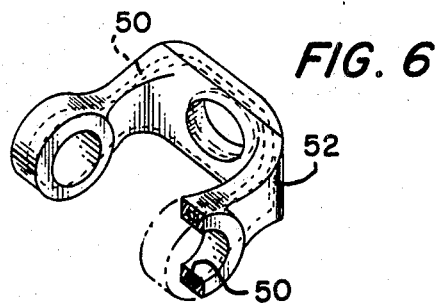
FIG. 6 is a perspective view partly in section of a bifurcated member having a steel core.

Another embodiment of universal joint fork forming part of my invention is disclosed in FIG. 6. The fork comprises a steel pressing 50 which is encased in plastic 52. The shape of the steel pressing 50 is the same as the shape of the plastic 52 except, of course, the dimensions of the plastic 52 are larger than the dimensions of the steel pressing 50.

The fork is made by dropping the steel pressing into a mold prior to the actual molding operation so that during the latter, plastic material flows around the pressing. This provides a fork for a universal joint which is basically plastic but which will still have a resilient steel core should excessive overload or other abuse cause the plastic to fracture.

I claim:

1. A universal joint comprising:
   a central member;
   two pairs of opposed rod ends extending from the central member; and bifurcate plastic members having their arms molded about the rod ends and a steel core of substantially the same shape as the outer plastic covering of the plastic member.

2. A universal joint in accordance with claim 1, wherein a bearing is mounted about each rod end; and the arms of the bifurcate plastic members are molded about the bearings.

3. A universal joint in accordance with claim 1, wherein the central member and rod ends are integral and made of plastic material.

4. A universal joint comprising:

a central member;

two pairs of opposed rod ends extending from the central member; and bifurcate plastic members having their arms molded about the rod ends, wherein the central member and rod ends are integral and made of plastic material.

5. A universal joint comprising:

a central member;

two pairs of opposed rod ends extending from the central member; and bifurcate plastic members molded about the rod ends with each arm of the bifurcate plastic members having a bore extending almost entirely through the arm thus providing a blind end, said rod ends extending substantially entirely into the bores wherein the central member and rod ends are integral and made of plastic material.

* * * * *